United States Patent [19]

Payne et al.

[11] 4,246,306
[45] Jan. 20, 1981

[54] ANTISTATIC FIRE-RETARDANT STRUCTURES, PARTICULARLY PIPES, OF REINFORCED PLASTICS MATERIAL

[75] Inventors: Kenneth G. Payne, Horsham; Richard D. Curnow, Little Stoke, near Bristol, both of England

[73] Assignee: Bristol Composite Materials Engineering Ltd., Bristol, England

[21] Appl. No.: 26,128

[22] Filed: Apr. 2, 1979

[30] Foreign Application Priority Data

Apr. 7, 1978 [GB] United Kingdom ............... 13666/78

[51] Int. Cl.$^3$ ........................ F16L 55/00; F16L 11/00
[52] U.S. Cl. ..................................... 428/36; 138/103; 138/125; 252/8.1; 428/921; 428/244
[58] Field of Search ................. 428/36, 921; 138/103, 138/125, 126, 178; 252/8.1

[56] References Cited

U.S. PATENT DOCUMENTS

| | | | |
|---|---|---|---|
| 1,381,413 | 6/1921 | Gardner | 428/921 |
| 2,937,665 | 5/1960 | Kennedy | 428/36 |
| 3,290,426 | 12/1966 | Barrentine | 138/103 X |
| 4,150,188 | 4/1979 | Brulet | 428/921 |

*Primary Examiner*—George F. Lesmes
*Assistant Examiner*—E. Rollins Buffalow
*Attorney, Agent, or Firm*—Lawrence Rosen

[57] ABSTRACT

Pipes or pipe fittings that are fire resistant and electrically conducting are formed by filament winding of a fire resistant, electrically conducting polymeric composition that includes 2 to 8% by weight of electrically conducting carbon black uniformly dispersed throughout the composition.

9 Claims, No Drawings

ANTISTATIC FIRE-RETARDANT STRUCTURES, PARTICULARLY PIPES, OF REINFORCED PLASTICS MATERIAL

Pipes formed of reinforced polymeric material are most conveniently made by filament winding, that is to say by winding a structure of reinforcing fibres saturated with polymeric composition onto a mandrel. Pipe fittings, such as joints and bends, are made by a similar method except that the structure is generally in the form of a preformed tape and the filament winding technique may then be referred to as tape winding.

A need has existed for a long time for corrosion-resistant pipes for use underground for the disposal of corrosive mine waters. However, in hazardous atmospheres, such as those in coal mines containing methane, the use of plastics materials for pipes has hitherto been inhibited by the high surface resistivity and low fire resistance usually associated with plastics materials. Attempts have been made to render pipes of plastics materials suitable for such uses but none of the attempts have been completely successful. For instance low surface resistivity has been obtained by application of an external conductive coating, or external metallic conductor, but this may lose its effectiveness through surface damage and, if there is also an inner coating or conductor, may cause the pipe to act as a capacitor. Articles of polymeric composition containing sufficient carbon black to render the article electrically conducting have been made by pressure moulding but such articles require a large amount of carbon black to render them adequately electrically conducting and the presence of large amounts of carbon black results in the polymeric composition, before curing, having such a high viscosity that it cannot be applied by filament winding. In general a composition that is to be applied by filament winding must have a viscosity of less than 70,000 cps as measured by a Brookfield LVT viscometer with a shearing rate of 0.6 r.p.m. at room temperature.

Investigation has established that the safety requirement as regards surface resistivity in hazardous atmospheres is that the surface resistivity should be less than $(7.5 \times 10^9)/D$ ohms where D is the external diameter of the pipe in millimeters. Typical sizes of pipe called for in British coal mines have D in the range 50 mm to 300 mm. For instance if D is 100 mm the surface resistivity must be less than $7.5 \times 10^7$ ohms.

The requirement concerning fire resistance is that, after the exterior of a pipe has been subjected to flame for 30 seconds, no flame or glow should persist for more than 5 seconds after the flame has been removed.

According to the invention a pipe or pipe fitting that is fire resistant and electrically conducting is formed of a wound fibrous reinforcement saturated with a fire resistant, electrically conducting polymeric composition that includes 2 to 8% (by weight of the composition) electrically conducting carbon black uniformly dispersed throughout the composition.

A method according to the invention for making such a pipe or pipe fitting comprises filament winding onto a mandrel reinforcing fibres saturated with an uncured polymeric composition having a viscosity less than 70,000 cps and that includes 2 to 8% (by weight of the composition) of an electrically conducting carbon black uniformly dispersed throughout the composition, and curing the composition.

It has surprisingly been found that if the polymeric composition is fire resistant then the desired electrically conducting properties can be achieved with much less carbon black than would be expected to be necessary and that it is thus possible to formulate a polymeric composition that has adequately low viscosity and a high wettability that it is capable of being used satisfactorily in a filament winding process. It is an important feature of the invention that the carbon black is dispersed uniformly throughout the composition, i.e. throughout the thickness of the pipe or pipe fitting, and thus is not present solely as a surface layer which is likely to be damaged. The polymeric composition is preferably based on a halogenated polyester, a furfuryl alcohol resin or a phenolformaldehyde resin. For many purposes the halogenated polyester is preferred. The polymeric material in the composition may be suitably fire resistant by itself but often an additive is included to improve its fire retardant properties. This additive may be a known fire retardant additive, such as a particulate aluminium compound or a halogenated phosphate or it may be an additive that by itself does not have any fire retardant properties but when reacted with the polymer improves the fire retardance adequately.

Tetrachloro phthalic anhydride polyester resin is the preferred polymeric material on which the composition is based. When a halogenated polyester is used, it is normally used in admixture with particulate fire retardant material, generally an aluminium compound such as aluminium trihydrate, and optionally also with some halogenated fire retardant material.

When the polymeric material of the composition comprises a furfuryl alcohol resin it is desirable to include an additional fire retardant additive, such as a halogenated phosphate. A suitable additive is tris(2,3-dibromopropylphosphate) also the furfuryl alcohol resin compositions must include an acid catalyst and the presence of this, in particular in excess, may promote fire retardance sufficiently to permit reduction or elimination of additional fire retardant.

When the polymeric material on which the composition is based is a phenolformaldehyde resin it is generally unnecessary to incorporate any fire retardant additive but instead it is desirable to include in the composition more acid hardener than is conventional. For instance the amount of acid hardener for a phenolformaldehyde or furfuryl alcohol resin is often 1 to 4% based on the weight of the composition but in the invention it is desirable to include 5 to 20% of acid hardener with a phenolformaldehyde resin. Preferably the phenolformaldehyde is a modified phenolformaldehyde resin.

It has surprisingly been found that the combination of carbon black and excess acid hardener or of carbon black and fire retardant additive that is non-conductive results in higher conductivity than the use of the same amount of carbon black without the added hardener or fire retardant additive. Consequently it is easily possible to formulate the composition suitable for filament winding and to conduct the filament winding such that the composition has uniform properties throughout, and in particular that the carbon black is not separated out from the composition.

It is naturally desirale that all ingredients of the polymeric composition should be restricted to those which do not have products of combustion which would be objectionable underground. Acetylene black is a very suitable type of carbon black, because it is the most conductive, but channel black, thermal black and furnace black could all impart a degree of conductivity depending on the particle size.

The reinforcing fibres may be in a variety of forms, for example fabric, filament winding rovings, chopped strand mat, woven rovings, or surfacing tissue. They are normally of glass. The polymeric compositions are preferably such that, in the absence of the carbon black, they would have a viscosity of 500 to 1000 centipoise. The compositions that are used must of course be such that the resin will penetrate the fibres and will wet the fibres so as to bond them thoroughly together and form a continuous polymeric matrix upon filament winding. The filament winding process may be conducted in conventional manner.

The pipes of the invention (and the pipe fittings) may be of circular cross-section and are of particular value for the disposal of corrosive mine waters. However they can be used for other purposes. If the fluid being conveyed by the pipe is an insulator, e.g. dry gas containing dust particles, then a further advantage of the pipe is that the surface resistivity internally of the pipe is low, in the same way as the external surface resistivity. The pipes are not restricted to ones that are intended for the transport of fluids. For instance the pipe may be used as a handrail, in which event its centre may not be hollow. Particularly when it is to be used as a handrail its cross-section may be, for instance, square.

The following are some examples of the invention.

EXAMPLE 1

4 parts of finely divided acetylene black (for instance Vulcan PF Carbon Black from Cabot Carbon Ltd, Ellesmere Port, Cheshire, England) are mixed with 100 parts of tetrachlorophthalic anhydride polyester resin into which has previously been mixed aluminium trihydrate fire retardant and, optionally a halogenated fire retardant (for example "Impol F924" from Honeywell Atlas Ltd., Mill Lane, Carshalton, Surrey, England), and 2 parts of 50% benzoyl peroxide paste. The resultant composition had a viscosity of 4500 cps. A pipe was wound from it using glass fibre rovings or glass tissue by conventional filament winding techniques and the resulting product cured at a temperature of 120° C. for 15 minutes. Its fire resistance passed the test defined above and its electrical resistance was 0.03 megohms. When the process was repeated using 10% carbon black the viscosity of the composition before curing was above 2 million cps which made it very difficult to filament wind satisfactorily. However the fire resistance was satisfactory and the electrical resistance was zero megohms.

EXAMPLE 2

4 parts of finely divided acetylene black were mixed with 100 parts of a phenolformaldehyde resin (for example the modified phenolformaldehyde resin sold under the Trade Name "Poltec 2" by Polymer Tectonics Ltd., 17 West Grove, London SE10, England) and 5 parts of an acidic hardener. This hardener may be any of the conventional strong acid hardeners used with phenolformaldehyde resins and conveniently is the product HL10C supplied by Polymer Tectonics Ltd. The resin mix was applied to layers of woven glass fibres and glass tissue and filament wound in conventional manner and the product allowed to gel at room temperature and then post cured at 120° C. for 15 minutes. The composition before curing had a viscosity of 66,500 cps. The cured product had satisfactory fire resistance and electrical resistance of 8 megohms. When the process was repeated using 10% hardener the fire resistance was again satisfactory but the electrical resistance was 6 megohms. When it was repeated using 15% hardener the fire resistance was again satisfactory but the electrical resistance was even lower. Thus in one process using 5% carbon black, 5% hardener and 90% Poltec 2 an electrical resistance of 0.1 megohms was obtained.

EXAMPLE 3

4 parts of finely divided acetylene black were mixed with 100 parts of a furfuryl alcohol resin to which had already been mixed tris(2,3-dibromopropylphosphate) as fire retardant (for example Quacorr 1500 FR supplied by Quaker Oats Ltd., Chemicals Division, Bridge Road, Southall, Middlesex, England) and 2½ parts of an acid catalyst, for example an aromatic acid such as catalyst 2001 from Quaker Oats Ltd. The mix had a viscosity of 2,680 cps and was applied to layers of woven glass fabric and glass tissue and the laminate allowed to gel at room temperature and then post cured at a temperature of 120° C. for 15 minutes. The cured product had satisfactory fire resistance and electrical resistance of 0.1 megohms. When the process was repeated using 10% carbon black the viscosity was above 1 million, which made it difficult to apply by filament winding, but the fire resistance on curing was satisfactory and the electrical resistance was zero. Similarly, with 15% carbon black, the fire resistance was again satisfactory and the electrical resistance zero but the viscosity was then above 2 million cps.

As a comparison a pipe was formed from a polymeric composition that was not fire retardant. Thus the process of Example 1 was repeated using a non-fire retardant polyester, that is to say an unhalogenated polyester, for example the product sold as Crystic 189 with varying amounts of carbon black and aluminium trihydrate fire retardant being added to it. The results are set out in the Table below in which FR stands for aluminium trihydrate fire retardant.

|  | A<br>4% C<br>0% FR | B<br>4% C<br>30% C | C<br>10% C<br>0% FR | D<br>10% C<br>30% FR | E<br>15% C<br>0% FR | F<br>15% C<br>30% FR |
| --- | --- | --- | --- | --- | --- | --- |
| Viscosity (cps) | 680 | — | 12200 | — | 2 mill. | — |
| Fire resistance | fail | fail | fail | fail | fail | fail |
| Electrical resistance (megohm) | infinity | infinity | infinity | zero | infinity | — |

These results show that the product is totally unsuitable whenever there is no added fire retardant, the electrical resistance being infinity, but comparison of C and D shows that the addition of the fire retardant when there is 10% carbon brings the electrical resistance down to zero, but the fire resistance is still unsatisfactory. It is highly surprising that the addition of a nonconducting fire retardant has this effect on the electrical resistance.

Throughout these Examples and specification, all percentages and parts are by weight unless otherwise stated.

As a result of the invention it is, for the first time, possible to make products having good corrosion resistance, good fire retardance properties and good mechanical strength combined with low electrical resistivity using a very workable resin that is capable of wetting the fibre reinforcement and being processed easily, all at an economic cost.

We claim:

1. A pipe or pipe fitting that is fire resistant and electrically conducting and that is formed of a wound fibrous reinforcement saturated with a fire resistant, electrically conducting polymeric composition that includes 2 to 8% by weight of the composition electrically conducting carbon black uniformly dispersed throughout the composition.

2. An article according to claim 1 in which the fire resistance of the polymeric composition is such that after the exterior of the pipe or pipe fitting has been subjected to flame for 30 seconds flame or glow persists for no more than 5 seconds after the flame has been removed and the electrical conductivity of the composition is such that the surface resistivity of the pipe is less than $7.5 \times 10^9/D$ ohms where D is the external diameter of the pipe in millimeters.

3. A pipe or pipe fitting according to claim 1 in which the polymeric composition comprises a halogenated polyester, furfuryl alcohol resin or phenolformaldehyde resin.

4. A pipe or pipe fitting according to claim 1 in which the polymeric composition comprises a halogenated polyester resin and a dispersion of a particulate fire retardant.

5. A pipe or pipe fitting according to claim 3 or claim 4 in which the halogenated polyester is a tetrachloride phthalic anhydride polyester.

6. A pipe or pipe fitting according to claim 4 or claim 5 in which the fire retardant is an aluminium compound.

7. A pipe or pipe fitting according to claim 1 in which the polymeric composition comprises a furfuryl alcohol resin and a fire retardant.

8. A pipe or pipe fitting according to claim 7 in which the fire retardant is a halogenated phosphate.

9. A pipe or pipe fitting according to claim 1 in which the polymeric composition comprises a phenolformaldehyde resin and more than 5% by weight of an acid hardener.

* * * * *